US011102135B2

(12) United States Patent
Nainar et al.

(10) Patent No.: US 11,102,135 B2
(45) Date of Patent: *Aug. 24, 2021

(54) LATENCY REDUCTION IN SERVICE FUNCTION PATHS

(71) Applicant: Cisco Technology, Inc., San Jose, CA (US)

(72) Inventors: Nagendra Kumar Nainar, Morrisville, NC (US); Carlos M. Pignataro, Cary, NC (US); Rajiv Asati, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/449,991

(22) Filed: Jun. 24, 2019

(65) Prior Publication Data
US 2019/0312818 A1    Oct. 10, 2019

Related U.S. Application Data

(63) Continuation of application No. 15/491,352, filed on Apr. 19, 2017, now Pat. No. 10,333,855.

(51) Int. Cl.
*H04L 12/841* (2013.01)
*H04L 29/06* (2006.01)
(Continued)

(52) U.S. Cl.
CPC .......... *H04L 47/283* (2013.01); *H04L 45/123* (2013.01); *H04L 45/306* (2013.01);
(Continued)

(58) Field of Classification Search
CPC . H04L 47/283; H04L 47/2408; H04L 67/325; H04L 69/22
See application file for complete search history.

(56) References Cited

U.S. PATENT DOCUMENTS 3,629,512 A    12/1971   Yuan
4,769,811 A    9/1988    Eckberg, Jr. et al.
(Continued)

FOREIGN PATENT DOCUMENTS

CN    103716123    4/2014
CN    103716137    4/2014
(Continued)

OTHER PUBLICATIONS

3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.
(Continued)

*Primary Examiner* — Jamal Javaid
*Assistant Examiner* — Ryan C Kavleski
(74) *Attorney, Agent, or Firm* — Polsinelli PC

(57) ABSTRACT

In some aspects, a method of the technology can include steps for sending a packet along a service function chain (SFC) to an egress node, the SFC comprising a plurality of service function forwarders (SFFs), wherein each SFF is associated with at least one service function (SF), and receiving the packet at a first SFF in the SFC, wherein the first SFF is associated with a first SF. In some aspects, the first SFF can also be configured to perform operations including: reading an option flag of the packet, and determining whether to forward the packet to the first based on the option flag. Systems and machine-readable media are also provided.

20 Claims, 5 Drawing Sheets

(51) Int. Cl.
*H04L 29/08* (2006.01)
*H04L 12/721* (2013.01)
*H04L 12/725* (2013.01)
*H04L 12/717* (2013.01)
*H04L 12/851* (2013.01)

(52) U.S. Cl.
CPC .......... *H04L 45/42* (2013.01); *H04L 47/2408* (2013.01); *H04L 67/2814* (2013.01); *H04L 67/325* (2013.01); *H04L 69/22* (2013.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta et al. |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |

(56) References Cited

U.S. PATENT DOCUMENTS

| | | |
|---|---|---|
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 10,333,855 B2 * | 6/2019 | Nainar ............... H04L 67/2814 |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 * | 7/2015 | Yong ............... H04L 45/306 370/392 |
| 2015/0215172 A1 | 7/2015 | Kumar et al. |
| 2015/0222516 A1 | 8/2015 | Deval et al. |

(56) References Cited

U.S. PATENT DOCUMENTS

| | | |
|---|---|---|
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0112337 A1* | 4/2016 | Zhang ............ H04L 47/17 370/237 |
| 2016/0119159 A1 | 4/2016 | Zhao et al. |
| 2016/0119253 A1* | 4/2016 | Kang ............ H04L 49/552 370/228 |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Maenpaa et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0104847 A1 | 4/2017 | Zhang et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0318097 A1* | 11/2017 | Drew .............. H04L 41/0806 |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

3GPP TR 23.803 V7.0.0 (Sep. 2005) Technical Specification: Group Services and System Aspects; Evolution of Policy Control and Charging (Release 7), 3rd Generation Partnership Project (3GPP), 650 Route des Lucioles—Sophia Antipolis Val bonne—France, Sep. 2005; 30 pages.

3GPP TS 23.203 V8.9.0 (Mar. 2010) Technical Specification: Group Services and System Aspects; Policy and Charging Control Architecture (Release 8), 3rd Generation Partnership Project (3GPP), 650 Route des Lucioles—Sophia Antipolis Val bonne—France, Mar. 2010; 116 pages.

3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne France, Dec. 2015.

3GPP TS 29.212 V13.1.0 (Mar. 2015) Technical Specification: 3rd Generation Partnership Project; Technical Specification Group Core Network and Terminals; Policy and Chargig Control (PCC); Reference points (Release 13), 3rd Generation Partnership Project (3GPP), 650 Route des Lucioles—Sophia Antipolis Valbonne—France, Mar. 2015; 230 pages.

Aldrin, S., et al. "Service Function Chaining Operation, Administration and Maintenance Framework," Internet Engineering Task Force, Oct. 26, 2014, 13 pages.

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

(56) References Cited

OTHER PUBLICATIONS

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright © 2016 Microsoft Corporation, 39 pages.

Author Unknown, "Service-Aware Network Architecture Based on SDN, NFV, and Network Intelligence," 2014, 8 pages.

Baird, Andrew, et al. "AWS Serverless Multi-Tier Architectures; Using Amazon API Gateway and AWS Lambda," Amazon Web Services Inc., Nov. 2015, 20 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Boucadair, Mohamed, et al., "Differentiated Service Function Chaining Framework," Network Working Group Internet Draft draft-boucadair-network-function-chaining-03, Aug. 21, 2013, 21 pages.

Bremler-Barr, Anat, et al., "Deep Packet Inspection as a Service," CoNEXT '14, Dec. 2-5, 2014, pp. 271-282.

Cisco Systems, Inc. "Cisco NSH Service Chaining Configuration Guide," Jul. 28, 2017, 11 pages.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Ersue, Mehmet, "ETSI NFV Management and Orchestration—An Overview," Presentation at the IETF# 88 Meeting, Nov. 3, 2013, 14 pages.

Farrel, A., et al., "A Path Computation Element (PCE)-Based Architecture," RFC 4655, Network Working Group, Aug. 2006, 40 pages.

Fayaz, Seyed K., et al., "Efficient Network Reachability Analysis using a Succinct Control Plane Representation," 2016, ratul.org, pp. 1-16.

Halpern, Joel, et al., "Service Function Chaining (SFC) Architecture," Internet Engineering Task Force (IETF), Cisco, Oct. 2015, 32 pages.

Hendrickson, Scott, et al. "Serverless Computation with OpenLambda," Elastic 60, University of Wisconsin, Madison, Jun. 20, 2016, 7 pages, https://www.usenix.org/system/files/conference/hotcloud16/hotcloud16_hendrickson.pdf.

International Search Report and Written Opinion from the International Searching Authority, dated Aug. 30, 2017, for the corresponding International Application No. PCT/US2017/040575, 13 pages.

Jiang, Y., et al., "An Architecture of Service Function Chaining," IETF Network Working Group Internet Draft, draft-jiang-sfc-arch-01.txt, Feb. 14, 2014; 12 pages.

Jiang, Yuanlong, et al., "Fault Management in Service Function Chaining," Network Working Group, China Telecom, Oct. 16, 2015, 13 pages.

Katsikas, Goergios P., et al., "Profiling and accelerating commodity NFV service chains with SCC," The Journal of Systems and Software, vol. 127, Jan. 2017, pp. 12-27.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Kumbhare, Abhijit, et al., "Opendaylight Service Function Chaining Use—Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

Newman, David, "Review: FireEye fights off multi-stage malware," Network World, May 5, 2014, 7 pages.

Nguyen, Kim-Khoa, et al. "Distributed Control Plane Architecture of Next Generation IP Routers," IEEE, 2009, 8 pages.

P. Quinn, et al., "Network Service Header," Network Working Group, Feb. 14, 2014, 21 pages; https://svn.tools.ietf.org/html/draft-quinn-sfc-nsh-02 .

P. Quinn, et al., "Service Function Chaining (SFC) Architecture," Network Working Group, May 5, 2014, 31 pages; https://svn.tools.ietf.org/html/draft-quinn-sfc-arch-05.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, P., et al., "Network Service Header," Network Working Group, Mar. 24, 2015, 42 pages; https://tools.ietf.org/pdf/draft-ietf-sfc-nsh-00.pdf.

Quinn, P., et al., "Network Service Chaining Problem Statement," draft-quinn-nsc-problem-statement-03.txt, Aug. 26, 2013, 18 pages.

Quinn, Paul, et al., "Network Service Header," Network Working Group, draft-quinn-nsh-00.txt, Jun. 13, 2013, 20 pages.

Quinn, Paul, et al., "Network Service Header," Network Working Group Internet Draft draft-quinn-nsh-01, Jul. 12, 2013, 20 pages.

Quinn, Paul, et al., "Service Function Chaining: Creating a Service Plane via Network Service Headers," IEEE Computer Society, 2014, pp. 38-44.

U.S. Appl. No. 15/252,028, filed Aug. 30, 2016, entitled "System and Method for Managing Chained Services in a Network Environment," Inventor(s): Hendrikus G.P. Bosch, et al.

Wong, Fei, et al., "SMPTE-TT Embedded ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.

Yadav, Rishi, "What Real Cloud-Native Apps Will Look Like," Crunch Network, posted Aug. 3, 2016, 8 pages; https://techcrunch.com/2016/03103/what-real-cloud-native-apps-will-look-like/.

Zhang, Ying, et al. "StEERING: A Software-Defined Networking for Inline Service Chaining," IEEE, 2013, IEEE, p. 10 pages.

\* cited by examiner

LATENCY REDUCTION IN SERVICE FUNCTION PATHS

CROSS REFERENCE TO RELATED APPLICATION

This application is a continuation of U.S. patent application Ser. No. 15/491,352 filed on Apr. 19, 2017, the contents of which is incorporated by reference in its entirety.

TECHNICAL FIELD

The disclosed technology relates to systems and methods for reducing packet latency in a service function path (SFP) of a software defined network (SDN). In particular, the subject technology provides ways to reduce packet latency and/or jitter by skipping optional service functions (SFs) when a predicted packet delay is likely to exceed a predetermined latency threshold.

BACKGROUND

The utilization of NFV and SDN technologies allows the decoupling of network functions from underlying hardware so they can run as software images or logical modules on commercial off-the-shelf and purpose-built hardware. NFV is possible implementing virtualization technologies (computers, networks, and storage media) to virtualize the network functions. One common objective of NFV deployments is to reduce the dependence on dedicated physical devices by allocating and using the physical and virtual resources only when and where needed. With this approach, service providers can reduce costs by shifting components to a common physical infrastructure while optimizing use. The virtualization of network functions can also accelerate the time to market for new services by allowing for more automated and streamlined approaches to service delivery.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
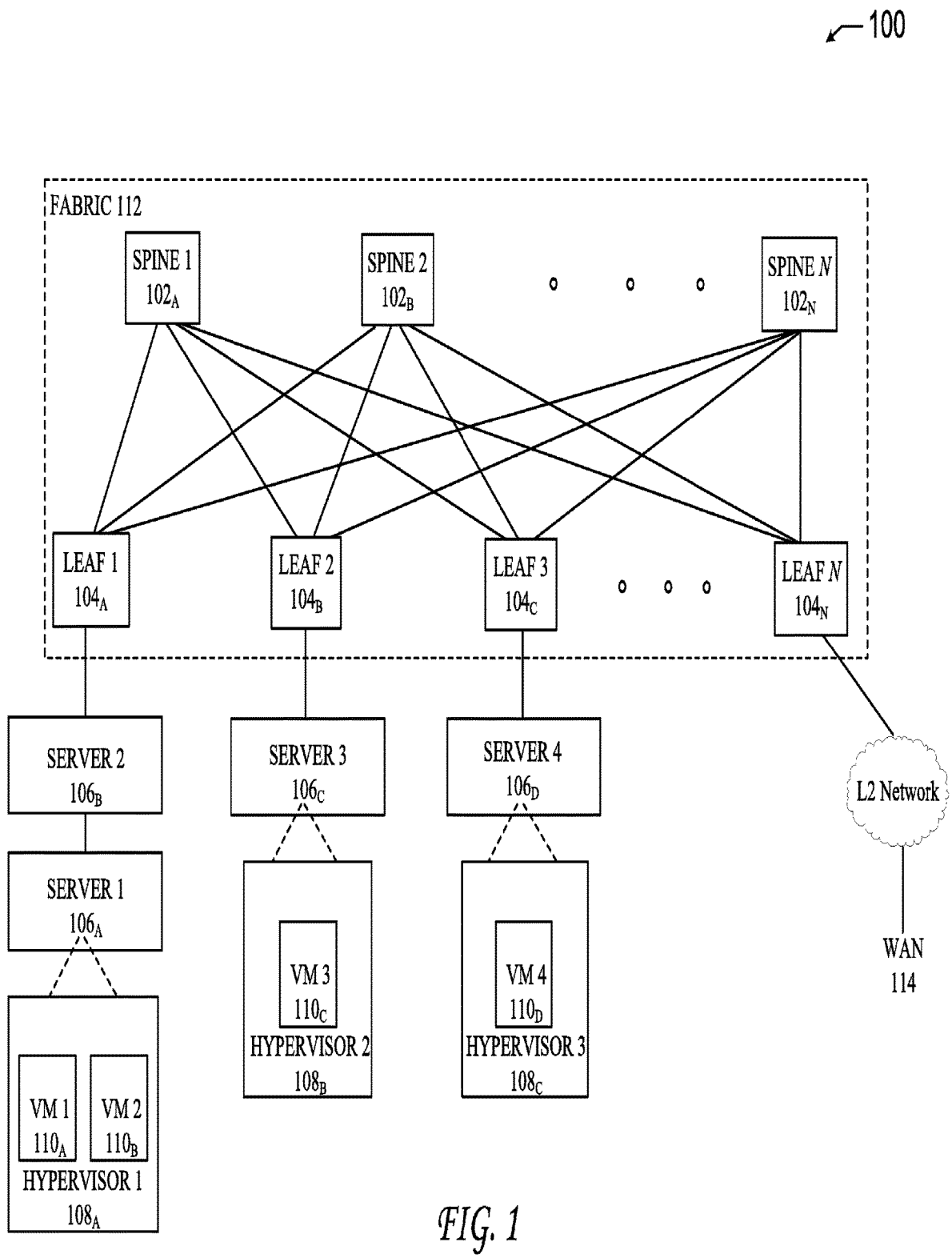
FIG. 1 illustrates an example virtual network environment that may be used to implement some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure are set forth in the description that follows, and in part are obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Aspects of the instant disclosure relate to systems, methods, and computer-readable media for reducing packet latency and/or jitter in an overlay network. In some implementations, a method of the technology can include steps for sending a packet along a service function chain (SFC) to an egress node, the SFC including multiple service function forwarders (SFFs) each associated with at least one service function (SF), and receiving the packet at a first SFF in the SFC, wherein the first SFF is associated with a first SF. In some aspects, the first SFF can also be configured to perform operations including, reading an option flag of the packet, and determining whether to forward the packet to the first SF based on the option flag.

As discussed in further detail below, option flag setting (or removal) by the SFF can be based on various network parameters. In some approaches, the option flag can be set (or removed) based on a packet time delay, and in particular, whether the delay has exceeded a pre-determined latency threshold, for example, that is specified by a Service Level Agreement (SLA). In other approaches, option flag setting can be based on a measured variance in packet delivery time (jitter). As such, option flag setting (or removal) can be implemented in some in-band operation, administration, and maintenance (iOAM) solutions to ensure policy compliance of select traffic flows.

Description:

A service function (SF) or "SF instance" can be implemented using a combination of hardware and/or software solutions. As discussed in further detail below, SF instantiation can be facilitated by a service function forwarder (SFF), for example that is configured to receive a packet, make a determination regarding an applicable service function type and based on the determination, forward the packet to the appropriate SF for network function invocation. Similar to other virtualized network components, SFFs can be logical modules implemented using a variety of hardware and software solutions. For example, SFs and SFFs can be implemented by software routines executed on the same (or different) virtual machines (VMs), or executed in separate logical environments for example, running on different VMs and located at geographically disparate locations. As used herein, an ordered set of SF invocations can be referred to as a "service function chain" (SFC).

SFCs are used to facilitate the ordered execution of predetermined service functions on traffic flows. However, due to time delays incurred with each SF invocation, traffic latency and packet delivery deviations (i.e., "jitter") are exacerbated for traffic moving over long SF paths. Aspects of the technology provide solutions for reducing latency and/or jitter by providing ways to avoid optional service functions in the service function path.

A latency threshold can be designated for a given service function path. The latency threshold can define a maximum acceptable delay for packet delivery across the network path, e.g., to a desired end-point or egress node. As discussed in further detail below, the latency threshold can be set as part of a Service Level Agreement (SLA), e.g., a contract between a network service provider and one or more end users that defines a level of service expected from the provider. Packet delivery delays predicted to exceed the latency threshold (e.g., causing violation of an SLA) can trigger the skipping of "optional" service functions, for example, that are of a lower priority and therefore not necessary for packet delivery.

The optional application of certain SFs can be indicated by setting an "option flag" in the packet data. By way of example, a given packet for which delivery to a destination egress node is predicted to exceed the latency threshold can be marked with an option flag by the processing/forwarding SFF. Based on the option flag, downstream SFFs can optionally skip packet presentation to one or more of their associated SFs, e.g., to speed transport of the packet along the service function path.

Additionally, in some aspects, packets for which an option flag has been set can be later predicted to achieve delivery within the latency threshold. In such instances, the processing SFF can rewrite (remove) the option flag, for example, to indicate that subsequent network function application is nondiscretionary. As such, each subsequent and downstream SFF can proceed with normal application of SFs. As with option flag setting, option flag removal can also be dictated by one or more network policies, such as those determined by an obtaining SLA.

Latency thresholds for a given SFP and/or traffic flow type can be user configured, for example, by a network administrator using a network controller. In other aspects, latency thresholds can be automatically designated and/or adjusted, for example, using an algorithm or machine learning approach. In yet another aspect, latency threshold may be automatically determined and/or configured based on one or more parameters dictated by a SLA or similar policy.

Time delay predictions for a given packet can be calculated at each SFF or at specifically designated SFFs in the service function chain. Time delay predictions can also be based on different types of metrics for information available to the processing SFF. For example, time delay predictions may be based on a number of hops in a service function chain, and/or time value designations that are specific to the type of SF invoked in the service function path.

FIG. 1 illustrates a diagram of an example virtual network environment 100 in which one or more service function chains can be implemented. Fabric 112 can represent the underlay (i.e., physical network) of environment 100. Fabric 112 can include spine routers 1-N (102$_{A-N}$) (collectively "102") and leaf routers 1-N (104$_{A-N}$) (collectively "104"). Leaf routers 104 can reside at the edge of fabric 112, and can represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-4 (106$_{A-D}$) (collectively "106"), hypervisors 1-4 (108$_A$-108$_D$) (collectively "108"), virtual machines (VMs) 1-4 (110$_A$-110$_D$) (collectively "110"), collectors 118, engines 120, and the Layer 2 (L2) network access to fabric 112. For example, leaf routers 104 can encapsulate and decapsulate packets to and from servers 106 in order to enable communications throughout environment 100. Leaf routers 104 can also connect other network-capable device(s) or network(s), such as a firewall, a database, a server, etc., to the fabric 112. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server 106$_A$ and hypervisor 108$_A$ can host VMs 110$_{A-B}$.

In some cases, VMs 110 and/or hypervisors 108 can be migrated to other servers 106. For example, VM 110$_A$ can be migrated to server 106$_C$ and hypervisor 108$_B$. Servers 106 can similarly be migrated to other locations in network environment 100. For example, a server connected to a specific leaf router can be changed to connect to a different or additional leaf router. In some cases, some or all of servers 106, hypervisors 108, and/or VMs 110 can represent tenant space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

As discussed in further detail below, VMs 110 can be used to implement one or more service chains SFCs (not illustrated).

Figure 2:
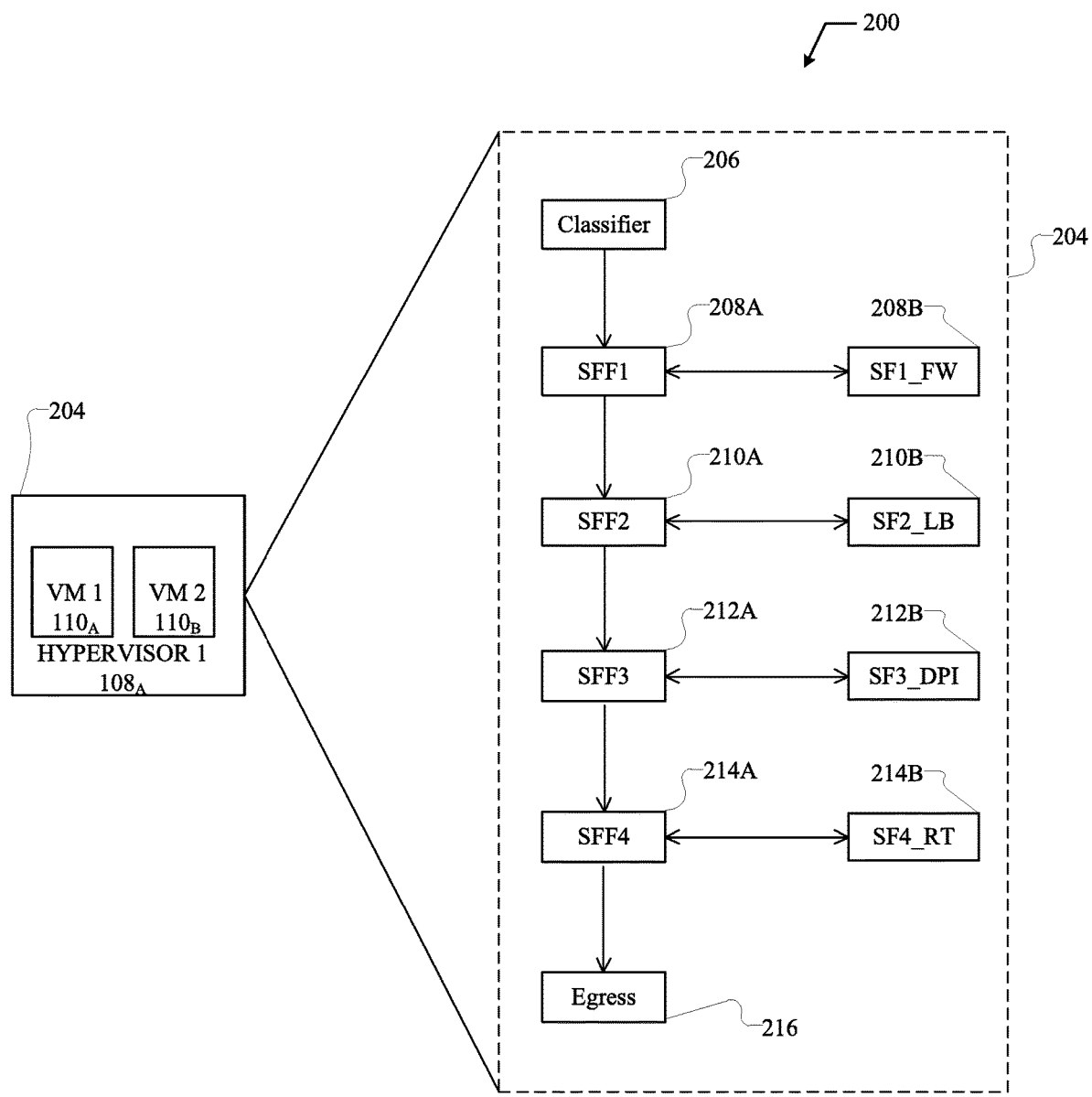
FIG. 2 illustrates a conceptual diagram of a service function chain (SFC), according to some aspects of the technology.

FIG. 2 illustrates an example environment 200 for implementing a service function chain (SFC) 204. Environment 200 includes server 202, which is configured to implement SFC 204; however, it is understood that one or more hardware or software components of SFC 204 can be implemented by one or more of logical modules on server 202, or on physically distinct hardware, for example, on one or more servers 106 represented by environment 100, as discussed above.

In environment 200, SFC 204 includes classifier 206, a plurality of service function forwarders (SFFs), i.e., SFF1, SFF2, and SSF3 (208A-214A), and an egress node 216. Each SFF is associated with a respective SF, i.e., SF1_FW, SF2_LB, SF3_DPI, and SF4_RT (208B-214B), configured to apply a particular function type to any received packets/data flows.

By way of example, in environment 200, SF1 (208B) is associated with a "firewall" function, SF2 (210B) is associated with a "load balancing" function, SF3 (212B) is associated with a "deep packet inspection" function, and SF4 (214B) is associated with a "routing" function, respectively. Although the example of environment 200 illustrates each SFF (e.g., 208A-214A) as paired with a single SF (e.g., 208B-214B), it is understood that each SFF can be associated with two or more SFs, without departing from the scope of the technology.

In practice, a packet received by classifier 206 is routed to egress node 216, via SFC 204. As the packet is transferred to each subsequent SFF (208A-214A), a determination is made, by the receiving SFF, as to whether the packet should be forwarded to one or more corresponding SFs. Depending on the desired implementation, determinations as to whether or not to skip a particular SF in the SFC may be made at each SFF, or only by pre-designated SFFs in the service chain.

SF forwarding determinations can be based on an option flag indicated in the packet data. Although the option flag can reside in any portion of the packet data, in some aspects, the option flag is indicated as part of an IP address header (e.g., in IPv6), or using data inserted between the IP address and payload, e.g., in a network service header.

In some approaches, SF forwarding determinations are made (e.g., by the processing SFF), based on a status indicated by the option flag, as well as a determination of whether a particular SF is "mandatory" or "optional." For example, even if an option flag indicates that SF forwarding should be skipped, SF forwarding can still occur if the associated SF is mandatory, e.g., if the SF is critical for security or packet delivery. However, if the option flag indicates that SF forwarding should be skipped, and the associated SF is optional, then the processing SFF can forward the packet to the next SFF in the SFC, reducing overall delivery latency by an amount of time it would have taken for application of the skipped SF.

Option flag settings can be evaluated/re-evaluated at each hop along the SFC, by particularly designated SFFs, or at certain times during the occurrence (or non-occurrence) of certain conditional events. For example, option flag settings can be re-evaluated at each SFF (208A-214A) in SFC 204, or at every other SFF (e.g., 210A and 214A). In some implementations, option flag evaluations may be triggered in response to detected changes in a SLA or other network policy.

By way of example, a packet forwarded by classifier 206 can include an option flag indicating that SF forwarding should be skipped when possible (e.g., the option flag is "present" or "set"). The option flag can be designated as part of the IP header of an IP address associated with the next SF. For example, classifier 206 can forward the packet to IP address 2001:1111::2, wherein address 2001:1111 is associated with SF1 208B, and '2' is used to designate invocation of the forwarding option. Upon receiving the packet, SFF1 208A inspects the packet to determine if it should be forwarded to SF1 208B. If the network function associated with SF1 208B is mandatory, then SFF1 208A sends the packet to SF1 208B. Alternatively, if the network function associated with SF1 208B is optional, SFF1 208A can forward the packet directly to the next hop in the SFC, e.g., SFF2.

In some instances, the option flag status can be reevaluated by the processing SFF. In such instances, SFF1 208A can make a determination as to whether or not a time delay associated with the packet is predicted to exceed the latency threshold for delivery to egress node 216. By way of example, if the latency threshold is 100 ms, and the determined time delay at SFF1 208A is 10 ms, then SFF1 208A can edit the option flag e.g., to indicate that SF delivery is mandatory e.g., since only four hops remain in the SFC. In such embodiments, SFF1 208A could forward the packet to IP address 2001:2222::1, where 2001:2222 indicates an IP address of SF2 210B, and '1' is the option flag used to indicate that SF forwarding (e.g., now by SFF2 210A) is mandatory.

Alternatively, if the latency threshold was 10 ms, and the determined time delay at SFF1 208A was 5 ms, then SFF1 may leave the option flag designation unchanged, e.g., to encourage further SF skipping along the SFC to increase a probability of delivery of the packet to egress node 216 within the designated latency threshold. In such embodiments, SFF1 208A would forward the packet to IP address 2001:2222::2, where 2001:2222 indicates an IP address of SF2 210B, and '2' is the unchanged option flag previously set by classifier 206.

Various types of calculations can be performed to make predictions as to whether the time delay of a packet is likely to exceed the latency threshold. By way of example, the current time delay can be compared to a latency threshold divided by the number of hops along the SFC. Alternatively, weighted time designations can be considered as between different SF types, for example, to take account for variations in processing time (at a time delay) for different SF types.

In some aspects, option flag status can be evaluated (or re-evaluated) based on a measured jitter for a particular traffic flow. For example, detected measures of jitter exceeding a predetermined variance or "jitter threshold" can trigger the re-evaluation of option flag setting for any (or all) packets in a corresponding traffic flow. As such, changes to option flag settings (e.g., latency thresholds and/or jitter thresholds) can also be based on changes to one or more network policies, such as an obtaining Service Level Agreement.

Figure 3:
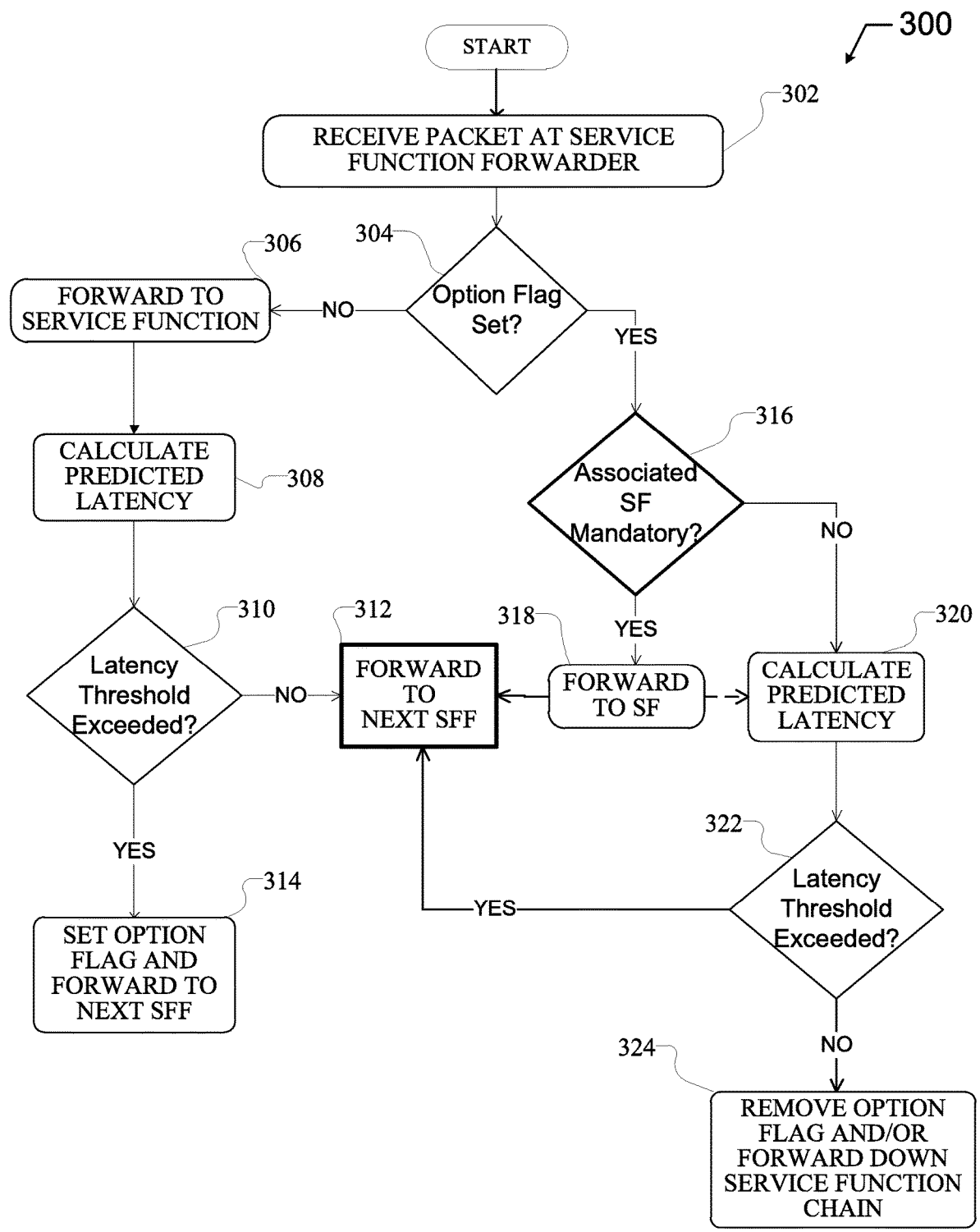
FIG. 3 illustrates a flow diagram of steps that used to implement an example SF prioritization method, according to some aspects of the technology.

FIG. 3 illustrates a flow diagram of steps to implement an example SF prioritization method 300, according to some aspects of the technology. However, it is understood that steps of method 300 can be performed in a different order, or may be optionally performed in certain implementations, without departing from the scope of the technology.

Method 300 begins with step 302 in which a packet is received by a service function forwarder (SFF). The receiving SFF can be any of a number of SFFs in an SFC, for example, along a network path to a destination egress node (e.g., egress node 216).

After the SFF has received the packet, method 300 proceeds to step 304 in which the SFF determines if an option flag has been set in the received packet. As discussed above, the option flag may have been written (or rewritten) by any SFF upstream in the SFC. If at step 304, if it is determined that no option flag has been set, method 300 proceeds to step 306, in which the SFF forwards the packet to its associated service function (SF). Subsequently, at step 308, the SFF performs a calculation to determine if a predicted latency of the packet exceeds a predetermined latency threshold for the SFC.

The predicted latency calculation can be based on a variety of network parameters and/or calculation methods. For example, the latency can be based on a number of SFs in the service function path, and an average time needed to apply a network function at each SF instance.

Next, at step 310, it is determined if the predicted latency calculated in step 308 exceeds a predetermined latency threshold for the SFC. If it is determined that latency threshold is not likely to be exceeded, method 300 proceeds to step 312 and the packet is forwarded to the next SFF in the SFC. Alternatively, in implementations wherein multiple SFs in the service function path are associated with a common SFF, forwarding may be simply performed to the next SF designated by the function path.

Alternatively, if at step 310 it is determined that the latency threshold is likely to be exceeded, method 300 proceeds to step 314, and an option flag is set in the packet before it is forwarded to the next SFF.

In some alternative approaches, step 310 may additionally (or alternatively) include a determination of whether a jitter for the corresponding traffic flow exceeds a predetermined jitter threshold. As discussed above, the jitter threshold can be a value specifying an acceptable amount of variance in packet delivery latency for a given traffic flow.

Referring back to step 304, if it is determined that the option flag in the received packet is not set, method 300 proceeds to step 316, wherein it is determined whether a next SFF designated in the service function path is mandatory. Mandatory SFs can include network functions with high priority designations, including, but not limited to SFs that perform: routing, firewall, and/or deep packet inspection functions, etc. It is understood that priority designations (i.e., to designated whether a given SF is mandatory or non-mandatory), can be configured, for example, by an administrator.

If at step 316 it is determined that the associated SF is mandatory, process 300 proceeds to step 318 wherein the packet is forwarded to the mandatory SF. Subsequently, in step 312, the packet is forwarded to the next SFF in the service function path. In some alternative implementations, after the packet is provided to required SF (e.g., at step 318), process 300 proceeds to step 320 in which a predicted latency for the packet is calculated.

Alternatively, at step 316, if it is determined that invocation of the associated SF is not mandatory, process 300 proceeds to step 320, where a calculated latency prediction is performed. Next, at step 322, it is determined if the predicted latency exceeds the predetermined latency threshold, and if so, method 300 proceeds back to step 312, and the packet is forwarded to the next SFF. Alternatively, if the latency threshold is not exceeded, the option flag of the packet is removed and/or the packet is forwarded down the service function chain, e.g., to the next SFF in the path, or to a final destination (egress) node.

Figure 4:
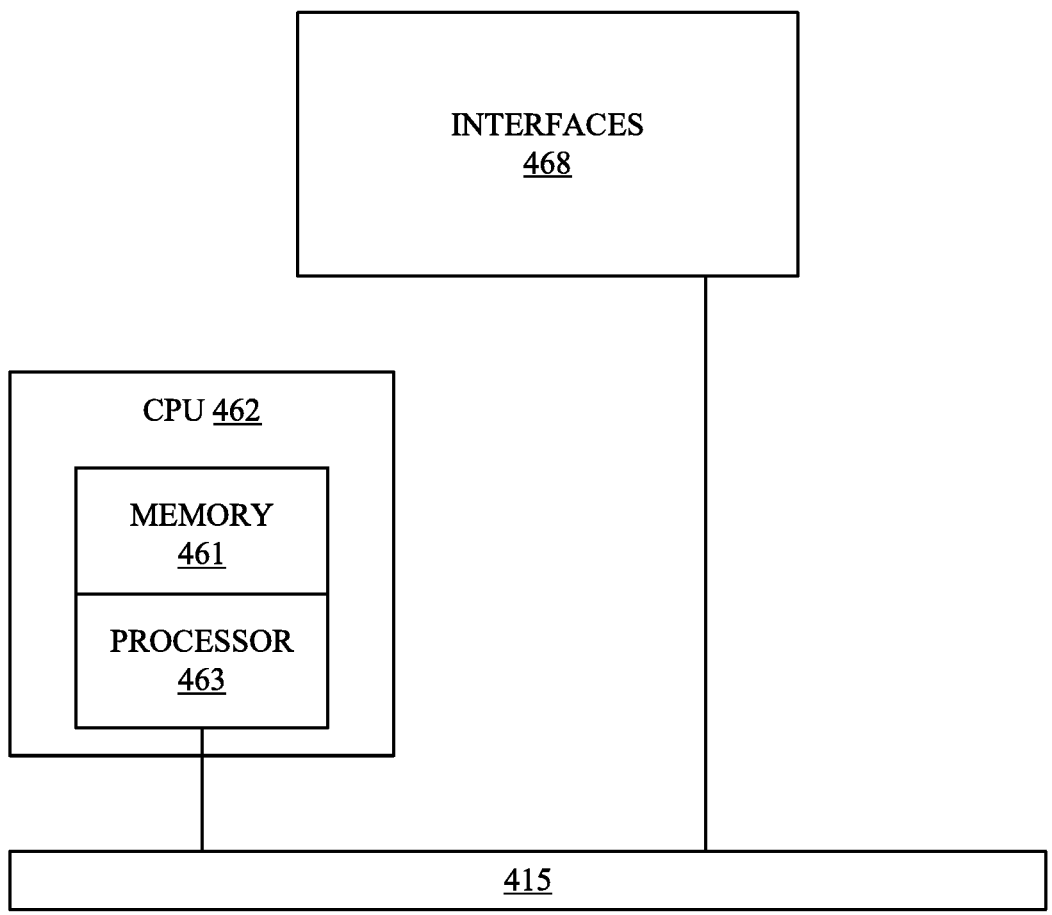
FIG. 4 illustrates an example of a network device.

FIG. 4 illustrates an example network device 410 according to some embodiments. Network device can be configured to provide hardware, software, and/or firmware necessary to support the implementation of one or more service function forwarder/s and/or service functions of the technology.

Network device 410 includes a master central processing unit (CPU) 462, interfaces 468, and a bus 415 (e.g., a PCI bus). When acting under the control of appropriate software or firmware, the CPU 462 is responsible for executing packet management, error detection, and/or routing functions. The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

Interfaces 468 are typically provided as interface cards (sometimes referred to as "line cards"). Generally, they control the sending and receiving of data packets over the network and sometimes support other peripherals used with the router 410. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5B:
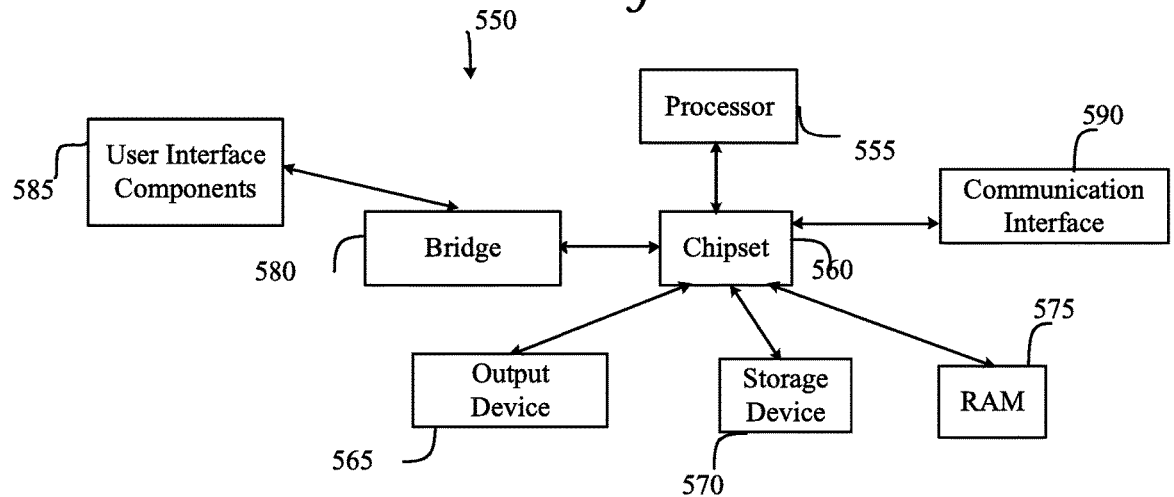
FIGS. 5A and 5B illustrate example system embodiments.
Figure 5A:
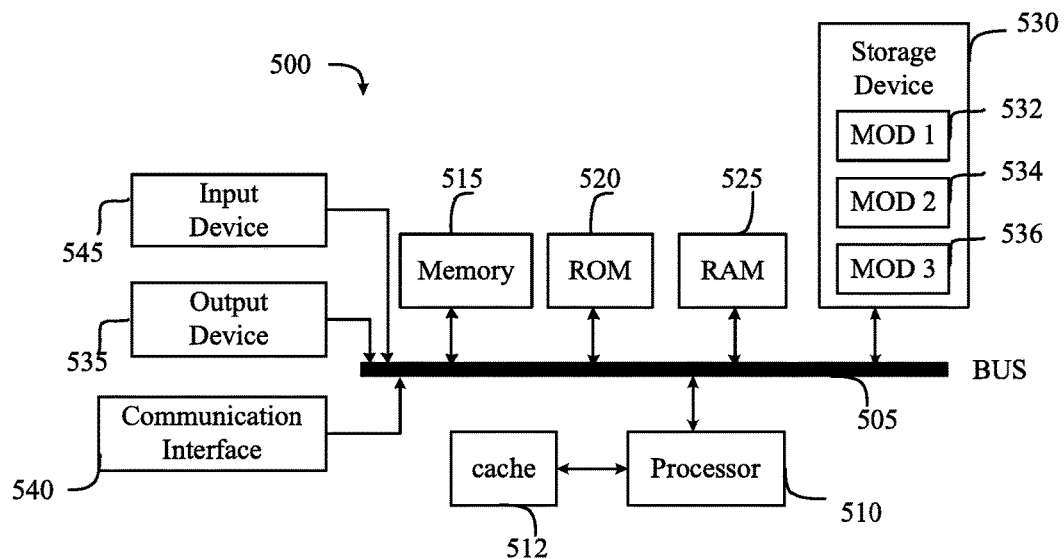

FIG. 5A and FIG. 5B illustrate example system embodiments. The more appropriate embodiment will be apparent to those of skill in the art when practicing the present technology. Persons of ordinary skill in the art will also readily appreciate that other system embodiments are possible.

FIG. 5A illustrates a system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 can be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor can be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

The invention claimed is:

1. A computer-implemented method comprising:
sending a plurality of packets along a service function chain (SFC) to an egress node, the SFC comprising a plurality of service function forwarders (SFFs), each of the plurality of SFFs associated with at least one service function (SF); and
receiving the plurality of packets at a first SFF of the plurality of SFFs, the first SFF associated with a first SF and configured to perform operations comprising:
reading an option flag of at least one packet of the plurality of packets,
in response to the option flag of the at least one packet being set, determining whether the first SF is a mandatory network function,
in response to determining that the first SF is a mandatory network function, forwarding the plurality of packets to the first SF and subsequently forwarding the plurality of packets to a second SFF in the SFC, and
in response to determining that the first SF is not a mandatory network function, forwarding the plurality of packets to the second SFF in the SFC.

2. The computer-implemented method of claim 1, wherein, the function is determined to be the mandatory network function, and the plurality of packets are forwarded to the second SFF after the forwarding of the packet to the first SF.

3. The computer-implemented method of claim 1, wherein, the function is determined to not be the mandatory network function, and the forwarding of the plurality of packets to the second SFF includes determining a latency threshold is exceeded.

4. The computer-implemented method of claim 1, wherein the reading of the option flag of the at least one packet of the plurality of packets includes determining whether the option flag is set.

5. The computer-implemented method of claim 4, wherein the plurality of packets are forwarded based on the determining whether the option flag is set.

6. The computer-implemented method of claim 1, wherein the option flag includes information stored in an Internet Protocol (IP) address header of the at least one packet of the plurality of packets.

7. The computer-implemented method of claim 1, wherein the option flag includes information stored between an Internet Protocol (IP) address header and a payload of the at least one packet of the plurality of packets.

8. A system comprising:
at least one processor;
a network interface coupled to the at least one processor; and
a memory device storing instructions that, when executed by the at least one processor, cause the at least one processor to perform operations comprising:
sending a plurality of packets along a service function chain (SFC) to an egress node, the SFC comprising a plurality of service function forwarders (SFFs), each of the plurality of SFFs associated with at least one service function (SF); and
receiving the plurality of packets at a first SFF of the plurality of SFFs in the SFC, the first SFF associated with a first SF and configured to perform SFF operations comprising:
reading an option flag of at least one packet of the plurality of packets,
in response to the option flag of the at least one packet being set, determining whether the first SF is a mandatory network function,
in response to determining that the first SF is a mandatory network function, forwarding the plurality of packets to the first SF and subsequently forwarding the plurality of packets to a second SFF in the SFC, and
in response to determining that the first SF is not a mandatory network function, forwarding the plurality of packets to the second SFF in the SFC.

9. The system of claim 8, wherein, the function is determined to be the mandatory network function, and the SFF operations further include forwarding the plurality of packets to the second SFF after the forwarding of the packet to the first SF.

10. The system of claim 8, wherein, the function is determined to not be the mandatory network function, and the SFF operations further include determining whether a latency threshold is exceeded before the forwarding of the plurality of packets to the second SFF.

11. The system of claim 8, wherein the reading of the option flag of the at least one packet of the plurality of packets includes determining whether the option flag is set.

12. The system of claim 11, wherein the plurality of packets are forwarded based on the determining whether the option flag is set.

13. The system of claim 8, wherein the option flag includes information stored in an Internet Protocol (IP) address header of the at least one packet of the plurality of packets.

14. The system of claim 8, wherein the option flag includes information stored between an Internet Protocol (IP) address header and a payload of the at least one packet of the plurality of packets.

15. A non-transitory computer-readable storage medium comprising instructions stored therein, which when executed by one or more processors, cause the processors to perform operations comprising:

sending a plurality of packets along a service function chain (SFC) to an egress node, the SFC comprising a plurality of service function forwarders (SFFs), each of the plurality of SFFs associated with at least one service function (SF); and receiving the plurality of packets at a first SFF of the plurality of SFFs in the SFC, the first SFF associated with a first SF and configured to perform SFF operations comprising:

reading an option flag of at least one packet of the plurality of packets, in response to the option flag of the at least one packet being set, determining whether the first SF is a mandatory network function, in response to determining that the first SF is a mandatory network function, forwarding the plurality of packets to the first SF and subsequently forwarding the plurality of packets to a second SFF in the SFC, and in response to determining that the first SF is not a mandatory network function, forwarding the plurality of packets to the second SFF in the SFC.

16. The non-transitory computer-readable storage medium of claim 15, wherein, the function is determined to be the mandatory network function, and the SFF operations further include forwarding the plurality of packets to the second SFF after the forwarding of the packet to the first SF.

17. The non-transitory computer-readable storage medium of claim 15, wherein, the function is determined to not be the mandatory network function, and the SFF operations further include determining whether a latency threshold is exceeded before the forwarding of the plurality of packets to the second SFF includes.

18. The non-transitory computer-readable storage medium of claim 15, wherein the reading of the option flag of the at least one packet of the plurality of packets includes determining whether the option flag is set.

19. The non-transitory computer-readable storage medium of claim 18, wherein the plurality of packets are forwarded based on the determining whether the option flag is set.

20. The non-transitory computer-readable storage medium of claim 15, wherein the option flag includes information stored in an Internet Protocol (IP) address header of the at least one packet of the plurality of packets.

* * * * *